(12) United States Patent
Mitsui et al.

(10) Patent No.: US 7,880,102 B2
(45) Date of Patent: Feb. 1, 2011

(54) ATTACHMENT STRUCTURE

(75) Inventors: Takahiko Mitsui, Makinohara (JP); Yutaka Sekino, Hadano (JP)

(73) Assignees: Yazaki Corporation, Tokyo (JP); Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 11/773,702

(22) Filed: Jul. 5, 2007

(65) Prior Publication Data

US 2008/0006515 A1 Jan. 10, 2008

(30) Foreign Application Priority Data

Jul. 5, 2006 (JP) .................... P2006-185136

(51) Int. Cl.
*H01H 9/00* (2006.01)

(52) U.S. Cl. .................. 200/61.54; 200/61.27

(58) Field of Classification Search .............. 200/61.54; 280/771, 779
See application file for complete search history.

(56) References Cited

U.S. PATENT DOCUMENTS

| 5,450,769 A | 9/1995 | Hu et al. | |
| 5,780,796 A * | 7/1998 | Uchiyama et al. | 200/61.54 |
| 5,883,348 A * | 3/1999 | Yokoyama | 200/61.54 |
| 6,403,900 B2 * | 6/2002 | Hecht et al. | 200/61.54 |
| 6,462,290 B1 * | 10/2002 | Matsumoto | 200/61.54 |
| 7,138,590 B2 * | 11/2006 | Mochizuki | 200/61.54 |
| 2005/0269192 A1 * | 12/2005 | Mochizuki | 200/61.54 |

FOREIGN PATENT DOCUMENTS

| EP | 0965492 | 12/1999 |
| GB | 2313710 | 12/1997 |
| JP | 09-19869 A | 7/1997 |
| JP | 9-198969 | 7/1997 |
| JP | 10-064646 A | 6/1998 |
| JP | 2001-001909 A | 1/2001 |
| KR | 10-0334468 B1 | 10/2002 |

\* cited by examiner

*Primary Examiner*—Renee Luebke
*Assistant Examiner*—Lheiren Mae A Caroc
(74) *Attorney, Agent, or Firm*—Morgan, Lewis & Bockius LLP

(57) ABSTRACT

An attachment structure includes a bracket that is arranged around a steering, a rotary connector device that has an engagement portion for being provisionally fixed to the bracket in a provisionally fixed state, and a combination switch that has a guide portion for being slidably retained to the bracket in the provisionally fixed state. The rotary connector device and the combination switch are completely fastened together with the bracket by a screw member from the provisionally fixed state.

7 Claims, 9 Drawing Sheets

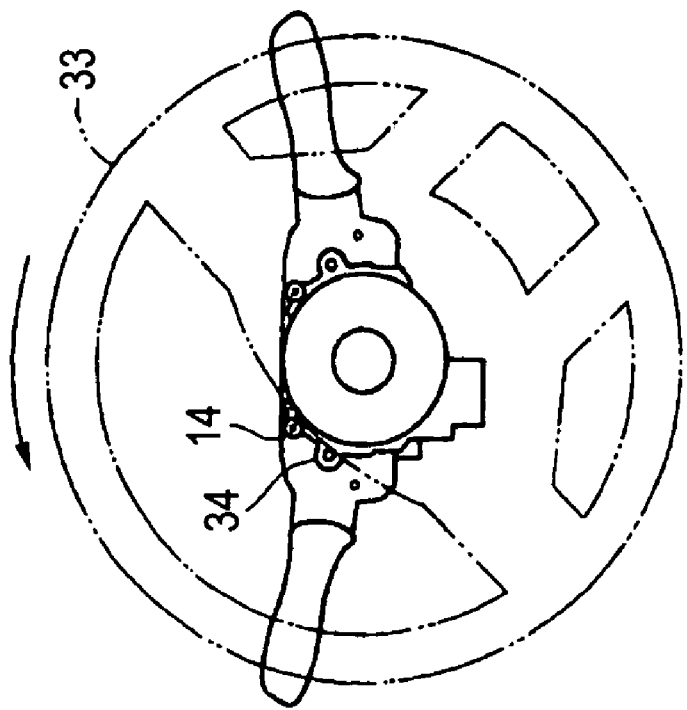
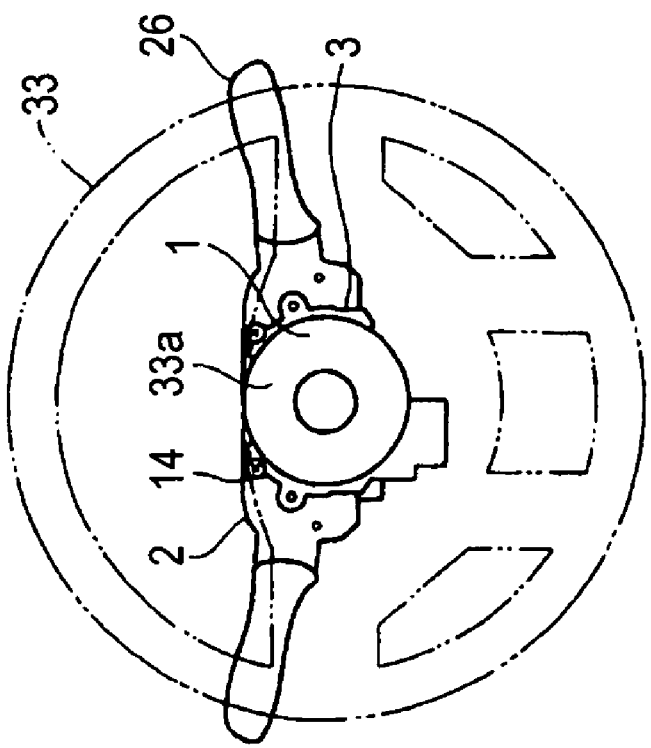

ATTACHMENT STRUCTURE

BACKGROUND OF THE INVENTION

The present invention relates to an attachment structure of attaching a rotary connector device and a combination switch for fixing a combination switch arranged around a steering of a vehicle and a rotary connector device to each other through a bracket.

FIG. 8 shows a rotary connector device in a related art (refer to Patent Reference 1).

The rotary connector device 61 is arranged at a vicinity of a steering 62 of a vehicle and includes a rotary cover 64 in a ring-like shape fixed to a steering shaft 63, a fixed cover 65 in a ring-like shape fixed to a combination switch 69 on an outer side of the steering shaft 63, and a flexible flat harness 67 wound substantially in a spiral shape at inside of a space 66 in a ring-like shape surrounded by the two covers 64, 65.

A roller 68 is rotatably provided in a circular space 66, and the flat harness 67 is disposed along an inner peripheral wall of the rotary cover 64 and an outer peripheral wall of the fixed cover 65 on an inner side and an outer side of the roller 68. One end of the flat harness 67 is connected from a side of the rotary cover to an air bag apparatus, a horn or the like at inside of the steering, and other end of the flat harness 67 is connected from a side of the fixed cover to a side of a power source or the like.

FIG. 9 shows a structure of attaching rotary connector device and a combination switch in a related art (refer to Patent Reference 2).

A combination switch 71 includes a main body portion 72 formed substantially in a U-like shape, and operating levers 73 provided on two left and right sides of the main body portion 72. The main body portion 72 includes a female screw portion 74 at a side face thereof. A steering shaft 75 is inserted to a center of the main body portion 72, the main body portion 72 is fixed to upper and lower brackets 76, 77 on a side of the screw shaft by screwing, and a rotary connector device 78 is fixed to the bracket 76 on an upper side by screwing.

The bracket 76 on the upper side includes a circular hole 79 to which the steering shaft 75 penetrates, and notched grooves 80 for inserting the two operating levers 73 of the combination switch 71. The main body portion 72 of the combination switch 71 is fixed to the brackets 76, 77 by screws from left and right directions, and the rotary connector device 78 is fixed to the bracket 76 from above by screws.

FIG. 10 shows a structure of attaching a rotary connector device and a combination switch in a related art (refer to Patent Reference 3).

A rotary connector device 81 includes a plurality of locking claws 83 at a bottom wall of a fixed cover 82, and a bracket 84 in a plate-like shape on a side of the steering shaft includes hole portions 85 for engaging with the respective locking claws 83. Guide grooves 87 of a combination switch of a dividing type (in the drawing, only a switch unit 86 on one side is shown) are engaged with two left and right sides of the bracket 84 in a sliding type to be fixed to a hole portion 89 of the bracket 84 by a locking claw 88.

The switch unit 86 on one side is for a turn signal and a dimmer, and a switch unit on other side, not illustrated, is for a wiper and a washer.

[Patent Reference 1] JP-A-10-64646 (FIG. 1)
[Patent Reference 2] JP-A-9-198969 (FIG. 1)
[Patent Reference 3] JP-A-2001-1909 (FIG. 1)

However, according to the structure of attaching the rotary connector device and the combination switch of FIG. 9 mentioned above, the combination switch 71 is fixed to the brackets 76, 77 by male screw members 90 from side directions, the rotary connector device 78 is fixed to the bracket 76 from above by a screw member 91, and therefore, a number of screw members 90, 91 and a number of integrating steps are needed.

Further, according to the structure of attaching the rotary connector device and the combination switch in the related art in FIG. 10, although the rotary connector device 81 and the combination switch 86 can simply be fixed to the bracket 84 respectively by the locking claws 83, 88, there is a concern that the rotary connector device 81 and the combination switch 86 are rattled or going to be detached by destructing the locking claws 83, 88 or weakening fixing forces of the locking claws 83, 88 by repeated attachment and detachment.

SUMMARY OF THE INVENTION

In view of the above-described point, it is an object of the invention to provide an attachment structure of attaching a rotary connector device and a combination switch capable of fixing a rotary connector device and a combination switch to a bracket simply and firmly at low cost and by a small number of steps.

In order to achieve the above-described object, an attachment structure, comprising:

a bracket that is arranged around a steering;

a rotary connector device that has an engagement portion for being provisionally fixed to the bracket in a provisionally fixed state; and a combination switch that has a guide portion for being slidably retained to the bracket in the provisionally fixed state, wherein the rotary connector device and the combination switch are completely fastened together with the bracket by a screw member from the provisionally fixed state.

By the above-described constitution, the combination switch is provisionally fixed to the bracket simply by being slid to be engaged therewith, and the rotary connector device is provisionally fixed simply by the engagement portion. The rotary connector device and the combination switch are simultaneously fixed to each other by fastening the screw member from the provisionally fixed state.

Also, by sliding to engage the combination switch with the bracket and provisionally fixing the rotary connector device by the engagement portion, the combination switch and the rotary connector device can simply be positioned, even when an operator releases the hand from the product under the state, the combination switch and the rotary connector device are not detached, and therefore, a completely fixing operation by fastening a screw can easily be carried out, further, the combination switch and the rotary connector device are fastened to the bracket to thereby completely fix, and therefore, a number of the screw members and a number of fastening steps are reduced, and attachment can be carried out at low cost and efficiently.

Preferably, the screw member is disposed at a position at which the screw member is exposed in view from a front side when the steering is turned by a predetermined angle from a neutral position.

By the above-described constitution, the rotary connector device and the combination switch can be attached and detached at a position of being turned from the neutral position by a predetermined angle in a state of attaching the steering (steering wheel). At the neutral position of the steering, the screw member is not seen from a driver, and therefore, an outlook thereof is excellent.

Also, the connector apparatus and the combination switch can be attached and detached in the state of attaching the steering, and therefore, assembling operability at automobile fabricating steps and maintenance performance at a repair shop or the like are promoted.

Preferably, at least two of the guide portions are arranged in a direction of sliding the bracket with respect to the combination switch.

By the above-described constitution, when the combination switch is slid to be engaged with the bracket, a slide stroke is shortened, and a force of provisionally fixing the combination switch is increased by the plurality of guide portions.

Also, the large provisionally fixing force can be achieved by the small sliding amount, and operability of assembling the combination switch to the bracket and reliability of fixing are promoted.

Preferably, a recessed groove having the guide portion is provided at a center of the combination switch. A protruded wall portion having a slidable retaining portion for retaining the guide portion is provided on the bracket. The protruded wall portion of the bracket is fitted into the recessed groove of the combination switch.

By the above-described constitution, the combination switch is reinforced by the bracket, and bending in a thickness direction of the combination switch caused by the recessed groove at the center of the combination switch is prevented.

Also, by reinforcing the weak portion of the combination switch by the bracket, and hampering the combination switch from being bent, operability of the operating lever of the combination switch is promoted.

Preferably, the rotary connector device has a circular wall. The projected wall portion of the bracket has a hole portion corresponding to the circular wall. Recessed portions for engaging the circular wall are provided on both sides of the recessed groove of the combination switch.

By the above-described constitution, by inserting the circular wall of the rotary connector device through the hole portion of the bracket so as to be engaged with the recessed portions of the combination switch, an accuracy of provisionally holding (provisionally fixing) the rotary connector device and a rigidity of a total of the combination switch are promoted.

Also, by engaging the circular wall of the rotary connector device with the recessed portion of the combination switch, an accuracy of provisionally holding the rotary connector device is promoted, the completely fixing operation is facilitated, and the rigidity of total of the combination switch is promoted to promote switching operability.

Preferably, the combination switch has a containing portion for containing the engagement portion of the rotary connector device.

By the above-described constitution, the engagement portion is prevented from interfering with an outer portion, thereby, unpreparedly release from being locked and destruction of the engagement portion are hampered.

Also, the engagement portion is prevented from being released from being locked unpreparedly by an interference with the outer portion, attaching operability in provisionally fixing the rotary connector device is excellently ensured, the engagement portion is prevented from being destructed and also the completely fixing force by the screw member is solidly ensured.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7A is a front view of a state of concealing a regular fixing portion of the rotary connector by a steering, and FIG. 7B is a front view of a state of exposing a regular fixing portion of the same;

DETAILED DESCRIPTION OF THE PREFERRED EMBODIMENTS

FIG. 1 to FIG. 5 show an embodiment of a structure of attaching a rotary connector device and a combination switch according to the invention.

Figure 1:
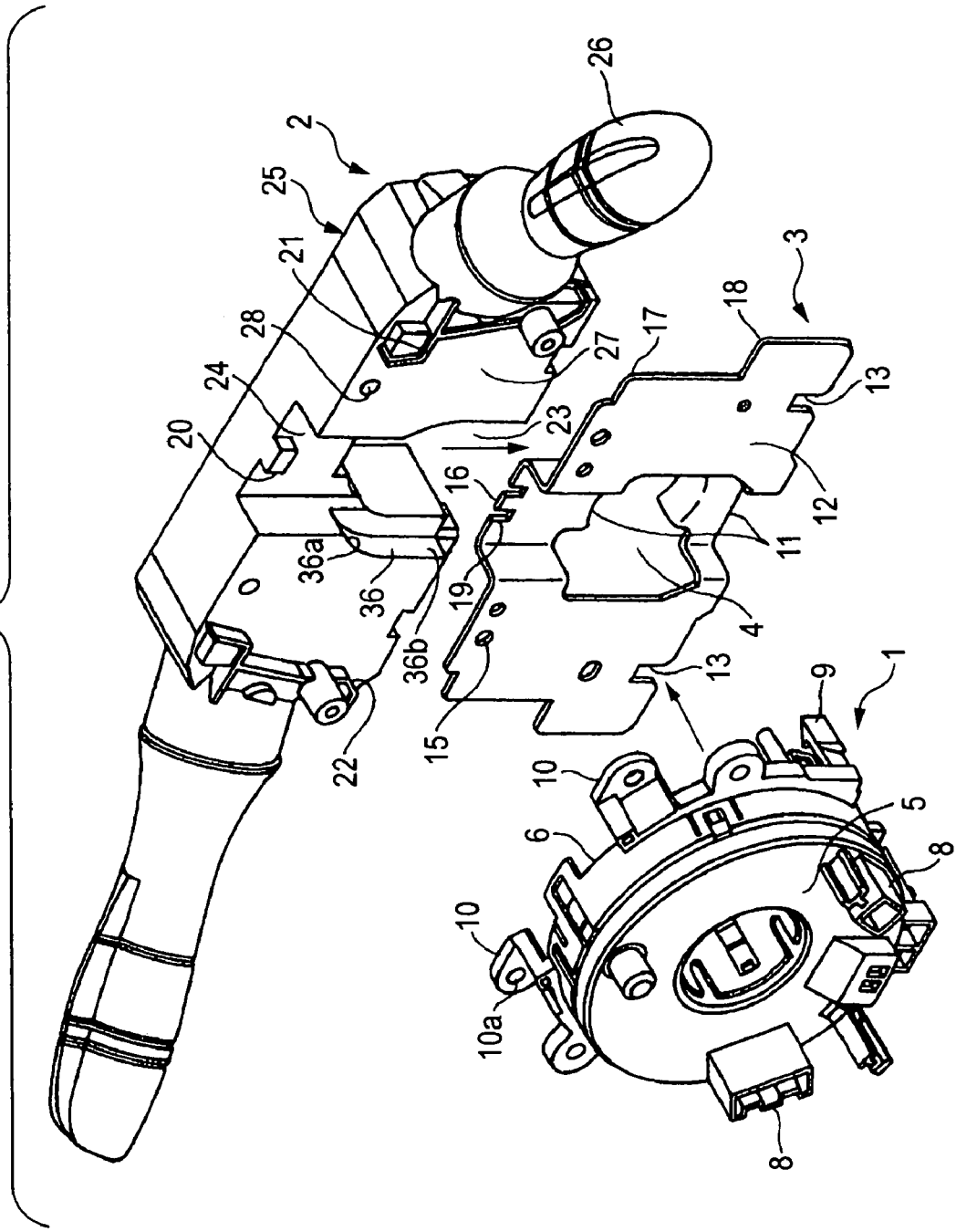
FIG. 1 is a disassembled perspective view showing an embodiment of a structure of attaching a rotary connector device and a combination switch according to the invention.

As shown in FIG. 1, a rotary connector device 1 and a combination switch 2 are fixed to each other by a bracket 3. A steering shaft (not illustrated) is inserted into a hole portion 4 of a center of the bracket 3, and the combination switch 2 is fixed to a resin cover (not illustrated) in a cylindrical shape around a steering.

In a basic structure of the rotary connector device 1, a flat wire harness (not illustrated) substantially in a spiral shape is contained in an inner side of a case which includes a fixed cover 6 and a rotary cover 5 which are in a ring-like shapes made of a synthetic resin. One end of the flat wire harness is connected to a connector 7 (FIG. 3) on a side of the fixed cover, and the other end of the flat wire harness is connected to a connector 8 on a side of the rotary cover.

As shown in FIG. 1 to FIG. 4, the rotary connector device 1 of the embodiment includes a pair of left and right locking claws (locking portions) 9 for provisionally fixing to the bracket 3 and a pair of left and right leg portions 10 for completely fixing thereto.

The locking claw 9 is constituted by a flexible support piece 9a (FIG. 6) and a claw portion 9b at a front end thereof, and is arranged on a lower half side of the fixed cover 6. The leg portion 10 is formed in an substantially L-like shape, constituted by a bottom wall 10b (FIG. 4) having a screw inserting hole 10a and a support wall 10c orthogonal to the bottom wall 10b, and is arranged on an upper half side of the fixed cover 6.

The bracket 3 is formed by a metal plate, includes a wall portion 11 in a projected shape (a recessed shape when viewed from a side of the rotary connector device) projected to a side of the combination switch 2 at a center thereof in a width direction, a notched grooves 13 for provisionally fixing to the locking claws 9 of the rotary connector device 1 on lower end sides of vertical wall portions 12 continuous to both sides of the wall portion 11, and screw inserting holes 15 for completely fixing to male screw members 14 (FIG. 4) on upper end sides of the wall portions 12 on the both sides. The screw inserting hole 15 may be notched to open on the upper end side of the wall portion 12.

Further, the upper end side of the wall portion 11 of the center and the upper end sides and middle portions in a height direction of the wall portions 12 on the both sides of the bracket 3 respectively include respective pairs of slide engaging portions 16 to 18 for provisionally fixing the combination switch (FIG. 1).

The slide engaging portion 16 on the upper end side of the center is constituted by a projected piece directed to upward. Both sides of the projected piece 16 are formed with notched grooves 19. The projected piece 16 is engaged with a hole portion 20a (FIG. 2) on an inner side of a projected wall 20 directed downward constituting a guide portion at an upper end of the center of the combination switch 2. The slide engaging portions 17 on both sides of upper ends are constituted by convex portions of the wall portions 12, and the slide engaging portions 18 on both sides of the middle portion are constituted by convex portions projected steppedly.

The combination switch 2 includes a vertical groove 23 penetrated at a center, a main body portion 25 having a recessed groove 24 continuous to an upper side of the vertical groove 23, and a pair of operating levers 26 projected to both sides of the main body portion 25. A portion of the recessed groove 24 of the main body portion 25 is formed to be thin-walled, and an upper end side of the thin wall portion (representatively designated by notation 24) is formed with the projected wall 20 in a shape of inverse L in a vertical section thereof as the guide portion and the vertical wall portion (recessed portion) 20a on an inner side thereof. The wall portion 20a is surrounded by the projected wall 20 on a front side and left and right sides and an upper side thereof and surrounded by an outer face of the thin wall portion 24 on a rear side thereof.

Figure 2:
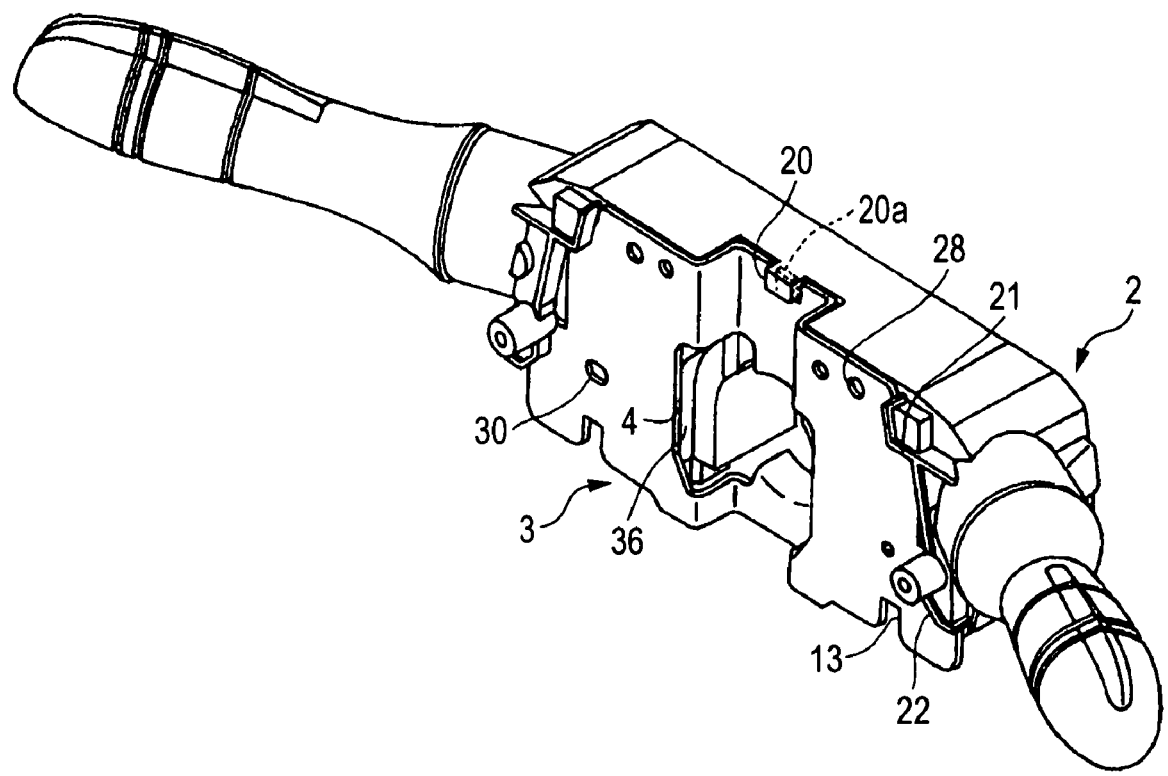
FIG. 2 is a perspective view showing a state of provisionally fixing a combination switch to a bracket.

A recessed portion 36 is provided at a thick wall portion 27 of the combination switch 2 continuous to the both sides of the vertical groove 23. The recessed portion 36 includes an upper portion 36a in a shape of a circular arc and the vertical straight portion 36b, and is disposed at inside of the hole portion 4 of the center of the bracket 3 as shown in FIG. 2. A ring-like wall 29 (FIG. 3) at a center of the rotary connector device 1 is projected from the hole portion 4 of the bracket 3 to be engaged with inside of the recessed portion 36. The upper portion 36a in the circular arc shape of the recessed portion 36 has a radius which is the same as a radius of the ring-like wall 29 in size, and an outer face of the ring-like wall 29 is brought into contact with the inner face of the upper portion 36a and an inner face of the straight portion 36b. It is preferable that a clearance between the inner face of the recessed portion 36 and the outer face of the ring-like wall 29 is as small as possible. By engaging the recessed portion 36 with the ring-like wall 29, an accuracy of provisionally holding the rotary connector device 1 is promoted and a rigidity of a total of the combination switch is promoted.

Figure 5:
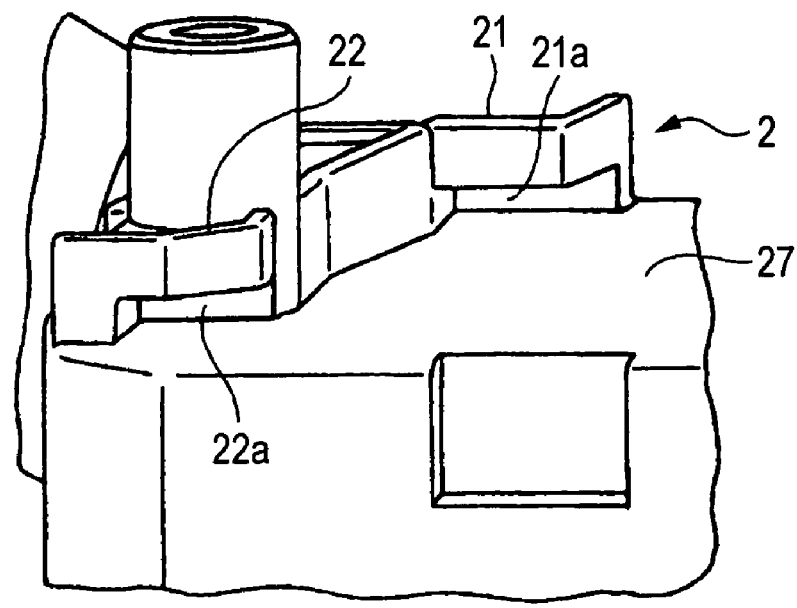
FIG. 5 is a perspective view showing a guide portion of a combination switch relative to a bracket.

Further, as shown in FIG. 5, upper end sides of the thick wall portions 27 on the both sides of the combination switch 2 are formed with projected walls 21 in three directions (upper side and down side and outer side) as guide portions, and vertical grooves 21a surrounded by the respective projected walls 21, and middle portions in a height direction of the wall portions 27 on the both sides are formed with projected walls 22 similarly as guide portions and vertical grooves 22a on inner sides thereof.

By forming a total of four (five when the guide portion 20 at the upper portion of the center (FIG. 1) is included) of the guide portions 21, 22 on upper and lower and left and right sides of the combination switch, the combination switch 2 is slid to be mounted (provisionally fixed) to the bracket 3 by a small stroke, easily and by a firm fixing force.

As shown in FIG. 2, the combination switch 2 is mounted to the bracket 3 fixed to the steering shaft (not illustrated) from above, the respective guide portions 20 to 22 of the combination switch 2 are slid to be engaged with the respective slide engaging portions 16 to 18 of the bracket 3 from above, and upper ends of the respective slide engaging portions 16 to 18 are brought into contact with the inner end faces of upper side walls of the respective guide portions 20 to 22 to thereby provisionally fix the combination switch 2 to the bracket 3 firmly by its own weight without being dropped. Under the state, positions of the screw inserting hole 15 of the bracket 3 and a female screw portion (female screw member) 28 of a female screw hole or a nut of the combination switch 2 are matched.

By engaging the wall portion 11 in the projected shape of the center of the bracket 3 with the recessed groove 24 of the center of the combination switch 2 and engaging the guide portion 20 with the slide engaging portion 16 at the center of the upper end of the wall portion 11, the thin wall portion (representatively designated by notation 24) of the combination switch 2 is reinforced by the bracket 3, and bending in a front and rear direction of the combination switch 2 in operating the operating lever 26 or the like is prevented.

Figure 3:
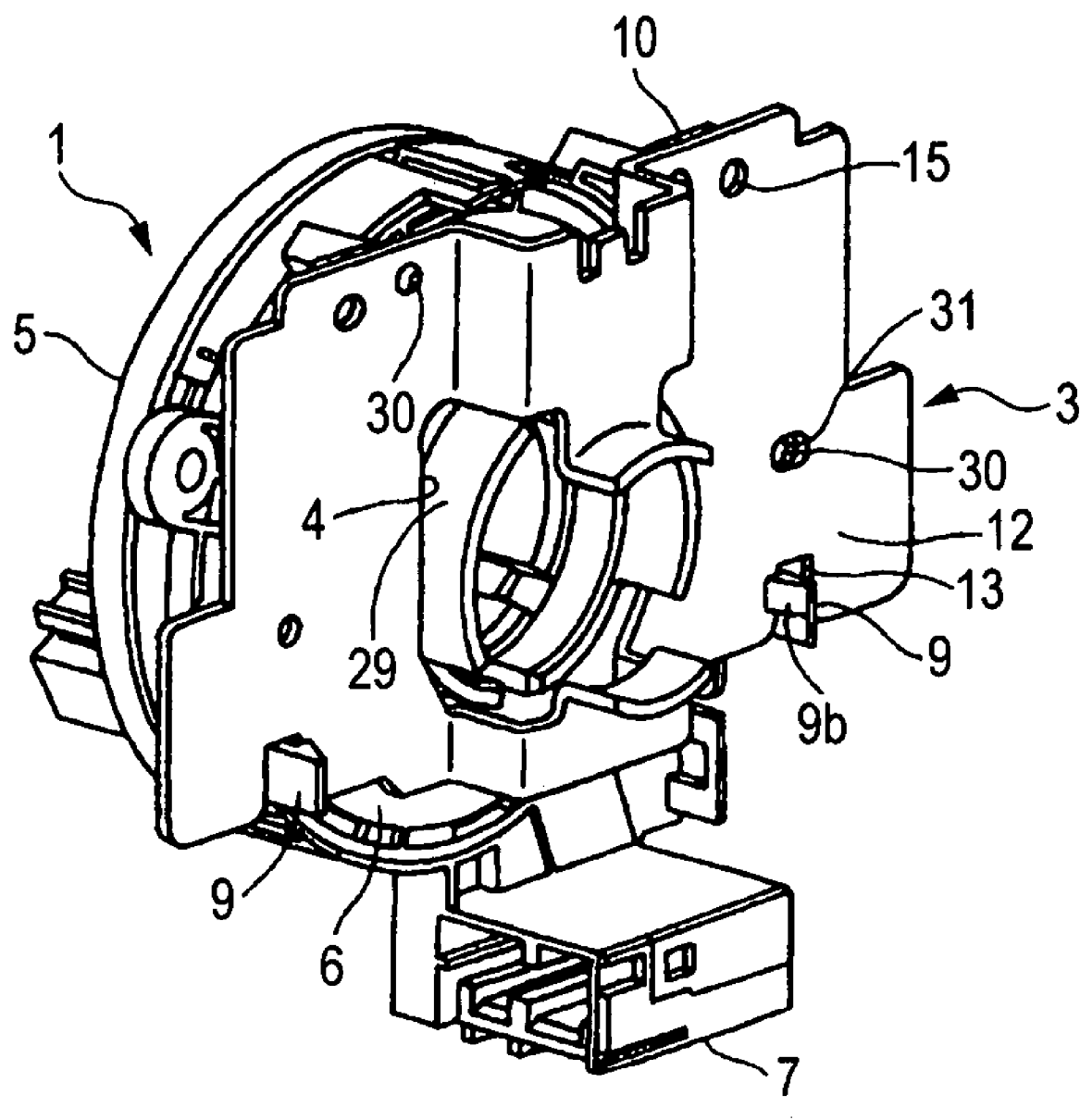
FIG. 3 is a perspective view showing a state of provisionally fixing a rotary connector device to a bracket.

As shown in FIG. 3, the rotary connector device 1 is provisionally fixed to the bracket 3 by engaging the locking claw 9 of the fixed cover 6 to the notched groove 13 on the lower end side of the bracket 3 while inserting the ring-like wall 29 of the center of the rotary cover 5 of the rotary connector device 1 to the hole portion 4 of the center of the bracket 3. Under the state, positions of the screw inserting hole 1 Oa (FIG. 2) of the leg portion 10 of the fixed cover 6 and the screw inserting hole 15 of the bracket 3 are matched.

Figure 4:
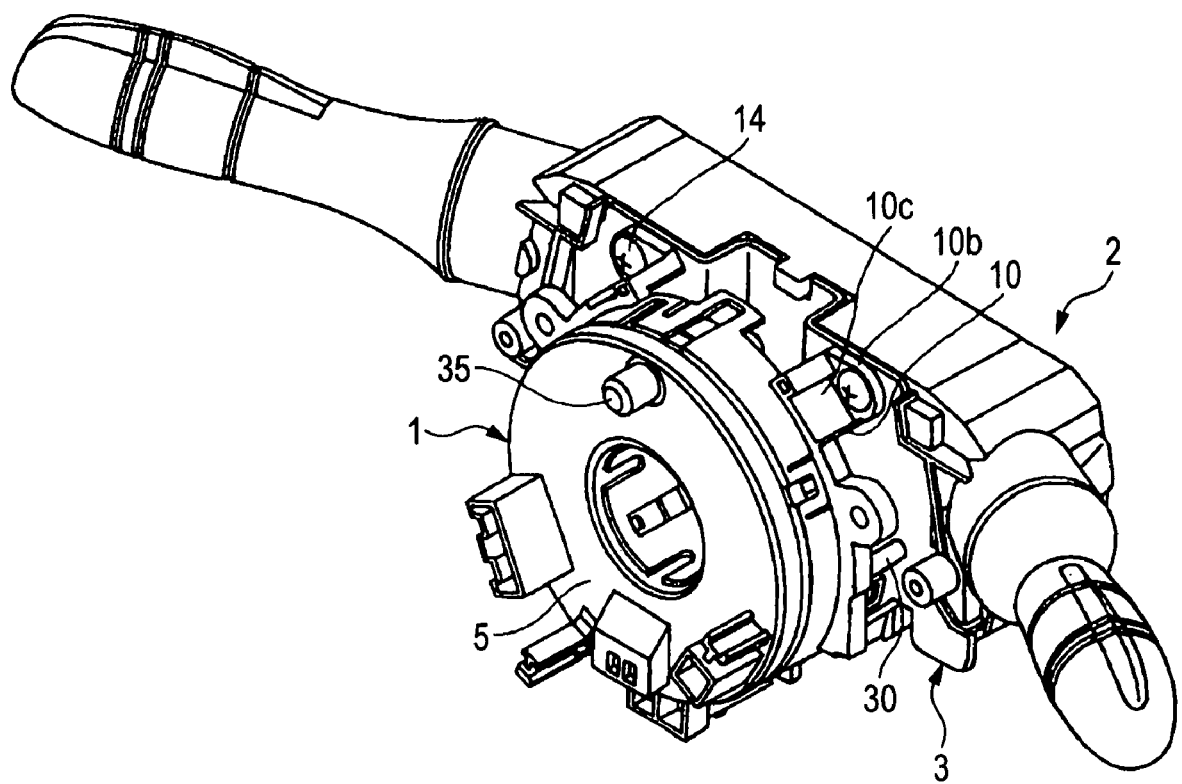
FIG. 4 is a perspective view showing a state of completely fixing a rotary connector device and a combination switch to each other by way of a bracket.

As shown in FIG. 4, the male screw member 14 is screwed from the screw inserting hole 10a of the leg portion 10 to the female screw portion 28 of the combination switch 2 through the screw inserting hole 15 of the bracket 3, and the leg portion 10 and the bracket 3 are fastened together with the combination switch 2 to be completely fixed thereby (the rotary connector device 1 and the combination switch 2 are fastened together with the bracket 3 to be completely fixed thereby).

The fixed cover 6 of the rotary connector device 1 is provided with pin portions 30 for positioning to the bracket 3 (FIG. 3, FIG. 4) on lower half both sides and the bottom face 10b of the leg portion 10, and in provisionally fixing of FIG. 3, the respective pin portion 30 are engaged with hole portions 31 of the bracket 3.

Figure 6:
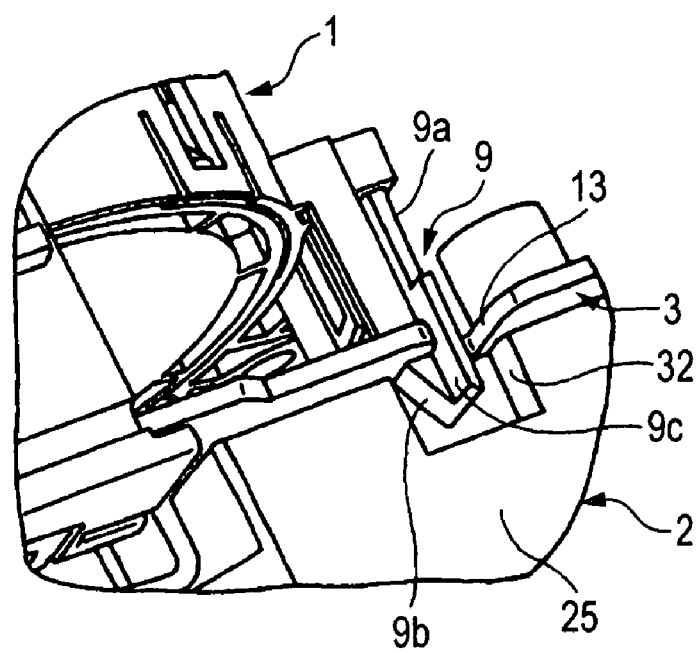
FIG. 6 is a perspective view showing a state of provisionally fixing a rotary connector to a bracket by a locking claw.
Figure 8:
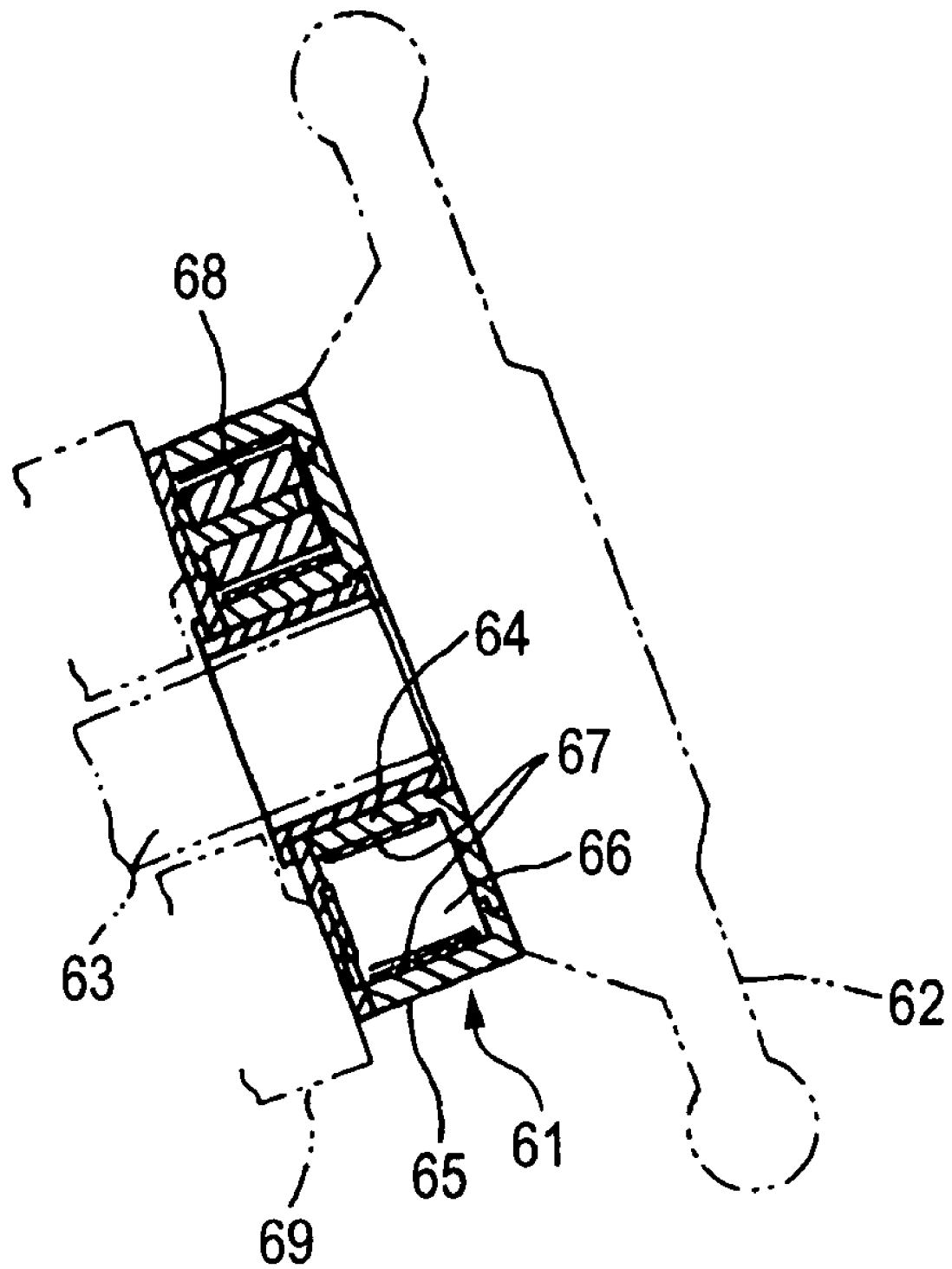
FIG. 8 is a vertical sectional view showing a mode of a rotary connector device of a related art.
Figure 9:
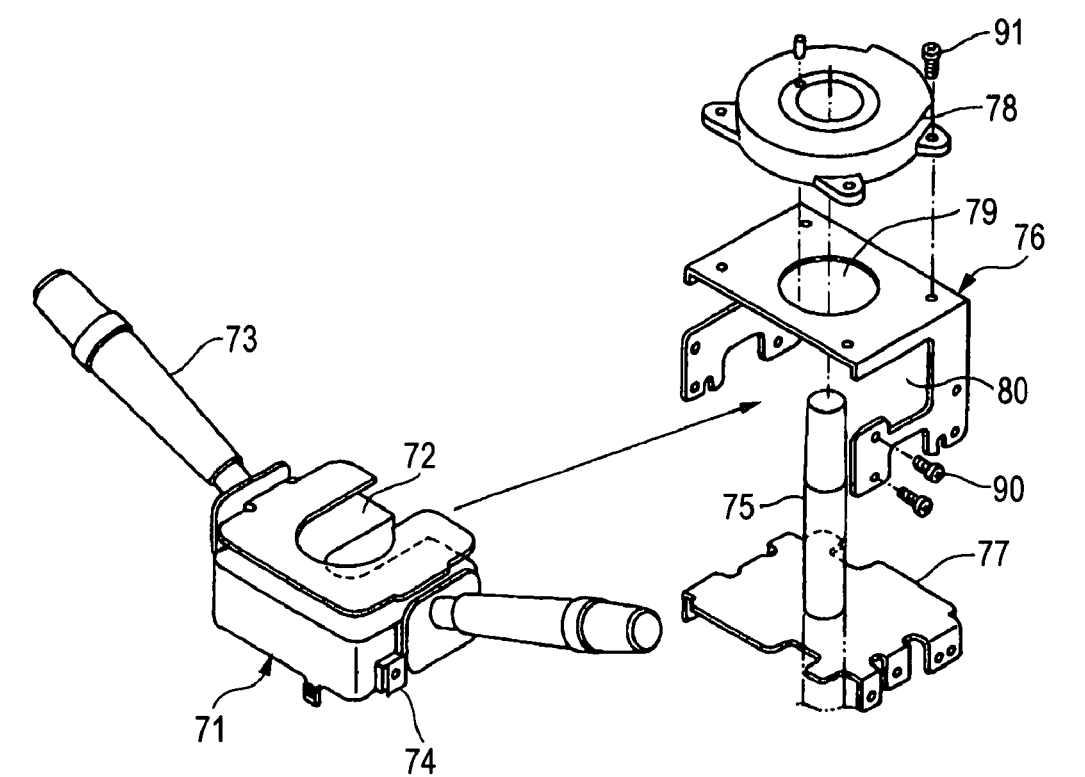
FIG. 9 is a disassembled perspective view showing a mode of a structure of attaching a rotary connector device and a combination switch of a related art.
Figure 10:
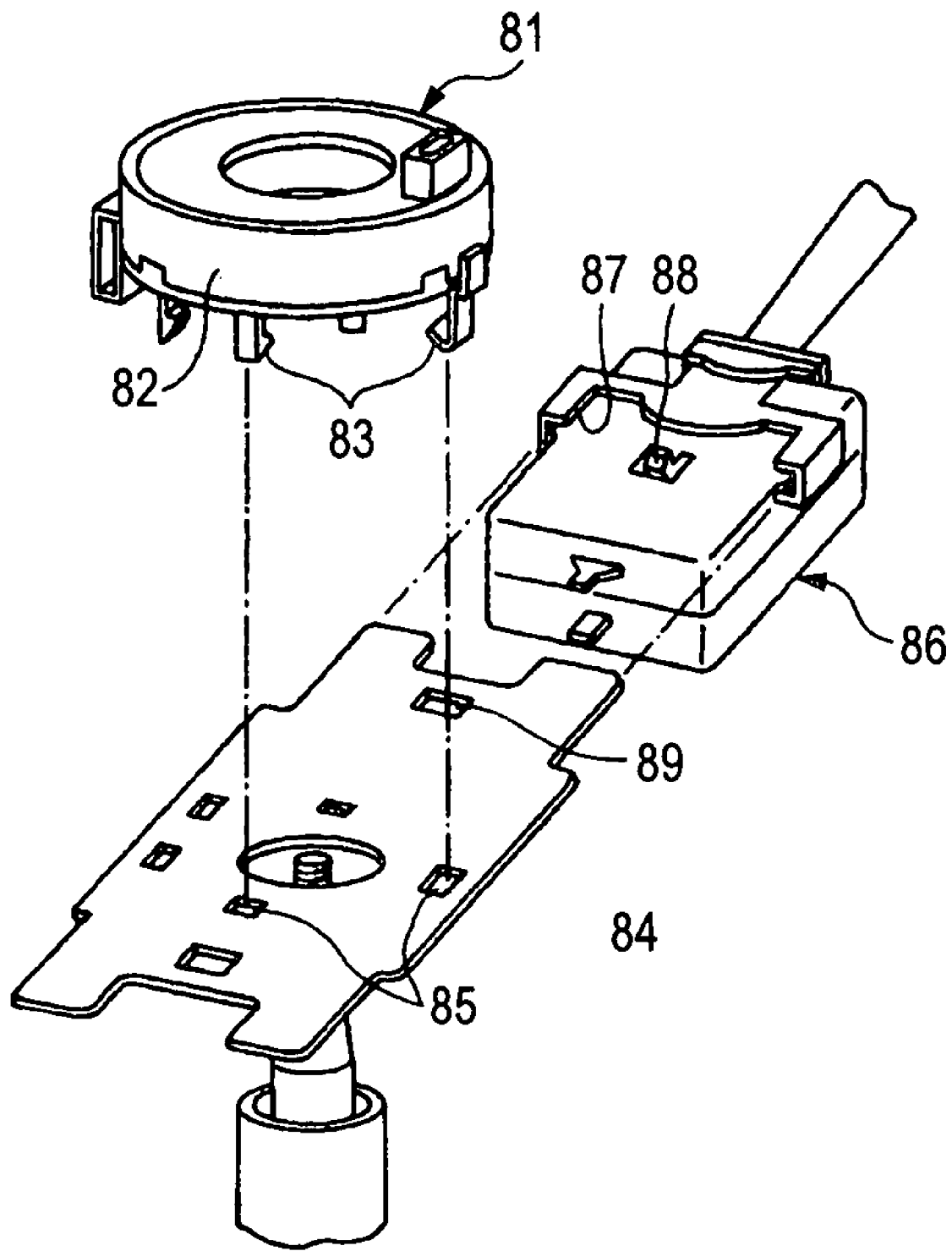
FIG. 10 is a disassembled perspective view showing other mode of a structure of attaching a rotary connector device and a combination switch of a related art.

Simultaneously therewith, as shown in FIG. 6, the locking claw 9 is engaged with the notched groove 13 of the bracket 3. Rattling or detachment of the locking claw 9 are prevented by the pin portion 30 for positioning. The notched groove 13 is provided with a clearance (representatively indicated by notation 13 of FIG. 6) for bending the locking claw 9 in an outer direction, the locking claw 9 advances to the notched groove 13 by being bent in the outer direction, and is engaged with a peripheral edge of the notched groove by being elastically recovered to direct in an inner direction at a time point at which the claw portion 9b reaches a back face of the bracket 3.

By provisionally fixing the rotary connector device 1 to the bracket 3 by the locking claw 9 and the pin portion 30, the rotary connector device 1 is not detached even when the hand is detached therefrom, an assembling and disassembling operation is facilitated. Tacked fixing is easily released by bending an operating piece 9c of the locking claw 9 in the outer direction.

The main body portion 15 of the combination switch 2 (FIG. 6) is provided with a hole portion (containing portion) 32 in which the claw portion 9b directed inward of the front end of the locking claw 9 advance, the claw portion 9b is protected against interference with an outer portion or the like, and the locking claw 9 is hampered from being released from being locked unpreparedly. The hole portion 32 is formed by a width capable of bending the locking claw 9 similar to the notched groove 13 of the bracket 3.

Although as shown in FIG. 7A, a head portion of the screw member 14 or the screw inserting hole 28 (FIG. 2) is concealed from a front side by a center portion 33a of a steering 33, as shown in FIG. 7B, the head portion of the screw member 14 or the screw inserting hole 28 is exposed in a state of slightly turning the steering 33 by a predetermined angle (the leg portion 10 (FIG. 1) for fixing is set at such a position), and therefore, regular fixing or releasing from fixing by the screw member 14 can be carried out while attaching the steering 33. A fixing portion 34 having a screw inserting hole of notation 34 is fixed to other part (can completely be fixed to the bracket 3).

In attaching the steering 33, a pin 35 directed forward of the rotary cover 5 of the rotary connector device 1 of FIG. 4 is engaged with a hole portion (not illustrated) of the steering 33, and the rotary cover 5 is made to be rotatable integrally with the steering 33. A flat wire harness (not illustrated) at inside of the two covers 5, 6 is pivoted integrally with the rotary cover 5 to absorb rotation of the steering 33.

As a preferable order of assembling the rotary connector device 1 and the bracket 3 and the combination switch 2, first, the bracket 3 is arranged around the steering (the steering shaft is penetrated through the hole portion 4 of the center of the bracket 3), successively, the combination switch 2 is slid to be engaged (provisionally engaged) with the bracket 3 from above, successively, the rotary connector device 1 is provisionally locked by the bracket 3 from a front side. Under the state, the rotary connector device 1 and the combination switch 2 are fastened together with the bracket 3 to be completely fixed thereby by the male screw member 14 of a small screw or bolt.

As other order of assembling, the rotary connector device 1 and the combination switch 2 can be fastened together with the bracket 3 to be completely fixed thereby by sliding to engage the combination switch 2 to the bracket 3 previously as shown in FIG. 2, inserting the combination switch 2 and the bracket 3 through the steering shaft (inserting the steering shaft to the combination switch 2 and the bracket 3), and successively provisionally fixing the rotary connector device 1 to the bracket 3.

As still other order of assembling, the rotary connector device 1 and the combination switch 2 can be fastened together with the bracket 3 to be completely fixed thereby by the male screw member 14 by provisionally fixing the rotary connector device 1 to the bracket 3 previously as shown in FIG. 3, inserting the rotary connector device 1 to the bracket 3 to be the steering shaft (inserting the steering shaft to the rotary connector device 1 and the bracket 3), successively, sliding to engage the combination switch 2 to the bracket 3 while inserting the combination switch 2 to the steering shaft from above (inserting the steering shaft to the combination switch 2). In this case, it is necessary to notch to open the hole portion 32 (FIG. 6) of the combination switch 2 containing the locking claw 9 in a slide assembling direction.

Further, although according to the above-described embodiment, the locking claw 9 is used as a locking portion, in place of the locking claw 9, a flexible locking arm or locking frame piece or the like can be used and as the engaging portion on the side of the bracket, in place of the notched groove 13, a projection, a projected piece or the like can be used. Further, an engaging claw (not illustrated) can be projected from the bracket 3, and a groove portion or the like as a locking portion can be provided at the rotary connector device 1.

Further, although the hole portion 20a surrounded by the projected walls is used as the guide portion 20 at the center of the upper end of the combination switch 2, in place of the hole portion 20a, a groove portion or the like on an inner side of projected walls having a section in an inverse L-like shape can also be used. Further, although the hole portion 4 is provided at the center of the bracket 3, not the hole portion 4 but a notched groove similar to the vertical groove 23 of the combination switch 2 can be formed. However, in this case, an effect of reinforcing the combination switch 2 by the bracket 3 is reduced.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-185136 filed on Jul. 5, 2006, the contents of which are incorporated herein for reference.

What is claimed is:

1. An attachment structure, comprising:
   a bracket that is arranged around a steering wheel;
   a rotary connector device that has an engagement portion for being directly and provisionally fixed to the bracket in a provisionally fixed state; and
   a combination switch, that has one or more guide portions, for being slidably and directly retained to the bracket in the provisionally fixed state,
   wherein the rotary connector device and the combination switch are completely fastened together with the bracket by a screw member from the provisionally fixed state,
   wherein the bracket has a first face for attaching the rotary connector device and a second face for attaching the combination switch, the first face being opposite to the second face,
   wherein the bracket includes a projected wall portion, the projected wall portion is projected from the second face toward the combination switch,
   wherein the combination switch includes a recessed groove having a shape which corresponds to a shape of the projected wall portion, and
   wherein one of the one or more guide potions is a protruding portion formed on a top face of the recessed groove, the protruding portion is engaged to an edge portion of the projected wall portion of the bracket.

2. The attachment structure according to claim 1, wherein the screw member is disposed at a position at which the screw member is exposed in view from a front side when the steering wheel is turned by a predetermined angle from a neutral position.

3. The attachment structure according to claim 1, wherein at least two of the one or more guide portions are arranged in a direction of sliding the bracket with respect to the combination switch.

4. The attachment structure according to claim 1, wherein the recessed groove having the protruding portion is provided at a center of the combination switch;
   wherein the projected wall portion has a slidable retaining portion for retaining the protruding portion; and
   wherein the bracket has the projected wall portion, said projected wall portion is fitted into the recessed groove of the combination switch.

5. The attachment structure according to claim 1, wherein the rotary connector device has a circular wall;
   wherein the bracket has the projected wall portion, said projected wall portion has a hole portion corresponding to the circular wall; and
   wherein recessed portions for engaging the circular wall are provided on both sides of the recessed groove of the combination switch.

6. The attachment structure according to claim 1, wherein the combination switch has a containing portion for containing the engagement portion of the rotary connector device.

7. The attachment structure according to claim 1, wherein two of the one or more guide portions of the combination switch are a pair of guide projected portions, the pair of guide projected portions are slidably and directly retained to both side edge portions of the bracket.

* * * * *